United States Patent Office 2,822,285
Patented Feb. 4, 1958

2,822,285
COMPOSITE LEAD PHOSPHATE-LEAD SILICATE PIGMENTS

Adrian R. Pitrot, Uniondale, N. Y., assignor to National Lead Company, New York, N. Y., a corporation of New Jersey No Drawing. Application November 30, 1956
Serial No. 625,236

2 Claims. (Cl. 106—297)

This invention relates to lead pigments. More particularly, this invention relates to novel lead silicophosphate pigments and to methods for preparing the same, and to pigmented finishes comprising the same.

Composite lead pigments of various kinds have long been known to the art and have been widely employed in a variety of applications to which their particular individual properties rendered them especially suitable. Among these may be mentioned the composite lead sulfate-lead silicate pigments described and claimed in U. S. Patent No. 2,477,277 of Francis J. Williams and the present inventor, which find extensive use, for example, in outside paint formulations, where their outstanding resistance to weathering is advantageous. Also in this general class of pigments are the composite lead cromate-lead silicate pigments described in my U. S. Patent No. 2,668,122, which are widely used as anticorrosive pigments, replacing to a large extent the less economical pure lead chromate, zinc chromate and red lead pigments.

Although, as indicated above, the composite lead sulfate-lead silicate pigments possessed marked advantages, especially in exterior white or light-colored formulations, they nevertheless suffered from certain disadvantages which were also common to many of the pigments theretofore available. Among these disadvantages was a tendency, when used in certain pigment-vehicle combinations, to cause undesirable increases in paint viscosity. This tendency is shared by a great number of nevertheless popular pigments, and it is perhaps less accurate to speak of it as a disadvantage than as a possible area for improvement. At any rate, it is a highly desirable property in a paint pigment that it be capable of incorporation in ready-mixed paints and stored for extended periods of time without changing viscosity during storage.

Another disadvantage of the pigments heretofore available—or, more properly, a disadvantage in paints made from them—is the tendency of such paints to blister when exposed to an environment in which the vapor pressure of moisture in the substrate exceeds that in the ambient atmosphere. This property is, of course, characterisitc of the film as a whole, and is commonly, and naturally, thought of primarily in conection with the film-forming ingredients of the finish, such as oils, resins, etc. Nevertheless I have discovered that the pigment portion of the finish, at least in the case of the novel pigments hereinafter described, has a marked and important effect on the resistance of the paint film to blistering.

An object of this invention, therefore, is to provide an improved pigment. Another object is to provide an improved composite lead pigment. Still another object is to provide an improved lead pigment which is resistant to paint viscosity increases when stored for extended periods of time in the form of ready-mixed paints. A further object is to provide lead pigments which enhance the resistance to blistering of paint films in which they are employed. A still further object is to provide improved pigmented finishes capable of being stored for extended periods of time without bodying, and resistant to blistering when applied.

Other objects and advantages will become apparent from the following more complete description and claims.

Broadly, this invention contemplates a composite lead phosphate-lead silicate pigment comprising PbO, $P_2O_5$ and $SiO_2$ in physico-chemical combination.

In a particularly desirable embodiment, this invention contemplates a composite lead phosphate-lead silicate pigment consisting essentially of PbO, $P_2O_5$ and $SiO_2$ in physico-chemical combination, in respective amounts from 2 to 8 mols of PbO for each mol of $P_2O_5$ and from 0.75 to 7.5 mols of $SiO_2$ for each mol of PbO.

This invention also contemplates a pigmented surface-coating composition comprising a film-forming vehicle and a composite lead phosphate-lead silicate pigment comprising PbO, $P_2O_5$ and $SiO_2$ in physico-chemical combination.

This invention further contemplates a method for preparing a composite lead phosphate-lead silicate pigment which comprises forming a slurry of silica and litharge, agitating said slurry, during said agitation gradually adding to said slurry a solution of a soluble phosphate, and subsequently dewatering and calcining the solids portion of said slurry.

As starting materials, a wide variety of oxidic compounds of lead, phosphorus, and silicon may be employed, as will be apparent to those familiar with the art. For reasons of convenience and economy, however, I prefer to prepare the novel pigments of this invention from litharge, precipitated silica or a finely-divided native silica such as ground quartzite, and phosphoric acid or a water-soluble phosphate such as mono- or diammonium phosphate.

To achieve the desired intimate, uniform type of association referred to herein as "physico-chemical," it is essential that the respective oxides of lead, phosphorus and silica be brought into intimate contact under conditions favoring coalescence during the calcination step. Good results can be obtained, for example, by prolonged pebble-milling of litharge and silica with phosphorus pentoxide. A much more convenient and effective method, however, is to prepare a slurry of litharge and silica, and gradually add thereto an aqueous solution of phosphoric acid or a soluble phosphate, agitating the slurry vigorously during such addition. It is generally preferable to add a small amount of a so-called "solution catalyst" such as acetic acid, for the purpose of accelerating formation of lead phosphates by supplying a greater concentration of lead ions in the solution. The quantity and the basicity of the lead phosphate formed will depend on the relative amounts of phosphoric acid or soluble phosphate and litharge employed. The most basic of the lead phosphates will form first when phosphoric acid or a phosphate is added gradually to an excess of litharge. Generally, it is desirable to have an appreciable excess of litharge over that required to form the most basic lead phosphate with the amount of $P_2O_5$ employed. The free $SiO_2$ present in the slurry, although also capable to reacting with PbO, does not effectively compete with the activity of the phosphate ion, so that substantially no PbO reacts wtih $SiO_2$ except the excess PbO over the amount equivalent to the phosphate employed. Moreover, it is believed that the reaction with $SiO_2$ does not proceed at all at the low temperatures of the initial mixing, but only during the calcination step.

The calcination may be carried out at temperatures from about 500° to about 850° C., preferably between 700° and 800° C., for a period of from about 1 to about 3 hours. During the calcination step, residual moisture is driven off and the various constituents of the pigment become united in a physico-chemical combination. The exact nature of the physico-chemical bond is not fully established; it appears to be both chemical and physical in nature. The components retain to some extent their individual identity, as more than one phase can be distinguished upon examination under the light microscope, but the system behaves in paint formulations as if it consisted of one homogeneous substance, no evidence of segregation or the like being observable. Also, the composite pigment has properties that cannot be explained in terms of the individual properties of the components, in particular its improved storage characteristics and its surprising effect on blister-resistance. These facts indicate that some change of a chemical nature has taken place. These changes do not take place appreciably below a temperature of about 500° C., and the calcination must therefore be carried to that temperature at least. On the other hand, calcination at temperatures over about 850° C., tends to result in objectionable sintering and excessive particle growth, resulting in a gritty abrasive pigment of low hiding power. Within this range, optimum pigment properties are generally obtained in the range 700–800° C.

The proportions of the components may be varied considerably, but are critical to this extent: there must be sufficient PbO to react with all of the $P_2O_5$ and an additional amount of PbO which is believed to react with the $SiO_2$. There should, however, be an excess of $SiO_2$ over that required to react with the free PbO (meaning by "free PbO" that amount not required to react with the $P_2O_5$). To obtain optimum pigment properties, it is preferred to employ from 2 to 8 mols of PbO for each mol of $P_2O_5$ and from 0.75 to 7.5 mols of $SiO_2$ for each mol of PbO.

In order to illustrate more clearly the nature and characteristics of this invention, the following example is presented:

*Example*

14½ liters of water, 3397 grams of litharge, and 3350 grams of finely divided silica were placed in a 25 liter glass vessel equipped with a proper stirring device and reacted with the addition of 8.4 grams of glacial acetic acid, all at room temperature. 864.7 grams of 85% phosphoric acid were diluted in 2 liters of water and while the slurry of litharge, acetic acid and silica was kept under constant agitation, the phosphoric acid solution was slowly and constantly added thereto over a period of 1½ hours. At the end of this time, the slurry was filtered, dried and calcined in an electric muffle furnace in suitable dishes at a temperature of 750° C. for 2 hours. The product was found to possess a fine soft texture, was free of grittiness and was found on analysis to contain:

| | Percent |
|---|---|
| Lead monoxide | 46.3 |
| Phosphoric acid anhydride | 7.4 |
| Silica | 46.3 |

The soft aggregates present in this product were disintegrated in a swing hammer type mill.

This pigment was then incorporated into an outside white paint according to the following formulation:

50.59% pigment:
   100% lead phosphate-lead silicate pigment
49.41% vehicle:
   54.35% linseed oil—China-wood oil
   45.65% mineral spirits A portion of the resulting paint was put in a conventional paint container and stored for 10 weeks. At the end of this time, it was examined and found to have undergone practically no change in viscosity.

Meanwhile, the same paint (in fresh condition) had been subjected to a "blister-box" test in which the paint was brushed onto a thin wood panel, allowed to dry, and the panel then assembled to form one wall of an otherwise closed box-like container provided with an internal steam supply. The painted side of the panel was on the outside, exposed to the surrounding atmosphere. Results of the test showed the painted panel to be highly resistant to blistering, even after eight days continuous exposure in the blister box.

The present invention provides improved pigments suitable for use in interior and exterior paint formulations. The pigments possess improved storage characteristics coupled with good pigmentary properties. Paints incorporating the novel lead phosphate-lead silicate pigments of this invention possess improved resistance to blistering under conditions conducive to blistering. The method for making such pigments is simple and economical, and the resulting pigments, in addition to their other advantages, may be manufactured and sold more cheaply than pigments of comparable properties that have heretofore been available to the art.

While this invention has been described with reference to certain specific embodiments and by way of certain specific examples, these are illustrative only, and the invention is not to be construed as limited, except as set forth in the appended claims.

I claim:

1. A composite lead phosphate-lead silicate pigment consisting essentially of PbO, $P_2O_5$ and $SiO_2$ in physico-chemical combination, in respective amounts from 2 to 8 mols of PbO for each mol of $P_2O_5$ and from 0.75 to 7.5 mols of $SiO_2$ for each mol of PbO.

2. A pigmented surface-coating composition comprising a film-forming vehicle and a composite lead phosphate-lead silicate pigment comprising PbO, $P_2O_5$ and $SiO_2$ in physico-chemical combination, in respective amounts from 2 to 8 mols of PbO for each mol of $P_2O_5$ and from 0.75 to 7.5 mols of $SiO_2$ for each mol of PbO.

References Cited in the file of this patent

UNITED STATES PATENTS

| 2,233,042 | Barton | Feb. 25, 1941 |
| 2,477,277 | Williams et al. | July 26, 1949 |
| 2,483,469 | Kebrich | Oct. 4, 1949 |
| 2,668,122 | Pitrot | Feb. 2, 1954 |